United States Patent [19]

Goto

[11] Patent Number: 5,636,232

[45] Date of Patent: Jun. 3, 1997

[54] OPTICAL WAVELENGTH CONVERTER

[75] Inventor: Chiaki Goto, Kanagawa-ken, Japan

[73] Assignee: Fuji Photo Film Co., Ltd., Kanagawa, Japan

[21] Appl. No.: 323,884

[22] Filed: Oct. 17, 1994

[30] Foreign Application Priority Data

Nov. 5, 1993 [JP] Japan .................................. 5-276525

[51] Int. Cl.$^6$ ........................................................ H01S 3/10
[52] U.S. Cl. ............................ 372/21; 372/92; 372/98; 372/108; 372/22
[58] Field of Search ........................... 372/21, 22, 92, 372/98, 108, 33, 69–71, 75

[56] References Cited

U.S. PATENT DOCUMENTS

| | | | |
|---|---|---|---|
| 4,791,631 | 12/1988 | Baumert et al. | 372/22 |
| 5,173,799 | 12/1992 | Tanuma | 372/22 |
| 5,197,073 | 3/1993 | Oka | 372/22 |
| 5,243,611 | 9/1993 | Hyuga et al. | 372/22 |
| 5,278,851 | 1/1994 | Goto | 372/22 |
| 5,317,447 | 5/1994 | Baird et al. | 372/22 |
| 5,343,485 | 8/1994 | Okazaki et al. | 372/22 |
| 5,343,875 | 9/1994 | Okazaki | 372/21 |
| 5,381,430 | 1/1995 | Nozaki et al. | 372/22 |

*Primary Examiner*—Leon Scott, Jr.
*Attorney, Agent, or Firm*—Sughrue, Mion, Zinn, Macpeak & Seas

[57] ABSTRACT

An optical wavelength converter that converts the wavelength of the fundamental wave emitted from a fundamental wave light source by causing the fundamental wave to enter a non-linear optical material. The converter has a filter that absorbs only one of two wavelength-converted waves which is emitted from the non-linear optical material in directions opposite to each other. In the converter, light transmission end faces of an element interposed between the filter and the non-linear are covered with an antireflection coating. Alternatively, instead of the filter, the converter has a reflecting optical element which reflects only one of two wavelength-converted waves which are emitted from the non-linear optical material in directions opposite to each other, and which causes the reflected wavelength-converted wave to travel along an optical path which does not return to the non-linear optical material. In this construction, the light transmission end faces of the element interposed between the filter and the non-linear are also covered with an antireflection coating with respect to the wavelength-converted waves. Thus, variations in an output of the wavelength-converted wave resulting from variations in the wavelength of the fundamental wave are prevented.

26 Claims, 4 Drawing Sheets

OPTICAL WAVELENGTH CONVERTER

BACKGROUND OF THE INVENTION

1. Field of the Invention

The present invention relates to an optical wavelength converter for shortening the wavelength of a laser beam, and more particularly to an optical wavelength converter element designed to prevent output variations in a wave whose wavelength has been converted.

2. Description of the Prior Art

As disclosed in, for example, U.S. Pat. No. 4,656,635, a solid-state laser is publicly known in which a solid-state laser crystal, doped with rare earth elements such as neodymium, is pumped with a semiconductor laser or the like. In this type of solid-state laser, in order to obtain a laser beam having a much shorter wavelength, it is widely practiced that the wavelength of a solid-state laser beam is converted into a second harmonic wave by disposing a crystal of a non-linear optical material in a resonator of the laser.

In the wavelength converter that converts the wavelength of the fundamental wave in the manner as mentioned above, a wave whose wavelength has been converted, such as a second harmonic wave, is emitted from both sides of the non-linear optical material, i.e., the side where the fundamental wave enters and the opposite side thereto. For this reason, the light transmission end faces of an element, arranged on the fundamental wave light source side with respect to the non-linear optical material such as the solid-state laser, are conventionally covered with coating that reflects a wavelength-converted wave, thereby leading to an improved wavelength conversion efficiency. In such a construction, the wavelength-converted wave that is emitted from the fundamental wave entrance side of the non-linear optical material is reflected by the coating and turns back to the non-linear optical material. This returning wave is then combined with another wavelength-converted wave that is emitted in the direction opposite to the fundamental wave entrance side, as a result of which a wavelength-converted wave having a high intensity is output.

However, in the construction n which a wavelength conversion efficiency is improved in the manner as mentioned above, if the wavelength of the fundamental wave varies for any reason, a phase difference between the two wavelength-converted waves, which are emitted from the non-linear optical material in directions opposite to each other, also changes. Interference between these two wavelength-converted waves resulting from this change in phase difference might lead to significant variations in an output of a wavelength-converted wave produced after the waves have been combined together. In some case, this interference leads to a substantially zero output of the wavelength-converted wave. In such a case, it is difficult to completely correct output variations of the wavelength-converted wave even when so-called APC (automatic power control) is effected.

When a crystal having a birefringence is used as a solid-state laser crystal, as has been conventionally practiced, a wavelength-converted wave is returned to the non-linear optical material by providing the end faces of the crystal with a high reflection coating with respect to the wavelength-converted wave. To avoid the separation of the wavelength-converted wave into an ordinary ray and an extraordinary ray in the non-linear optical material, it is necessary for the end surface of the crystal close to the non-linear optical material to be covered with a high reflection coating. In such a construction, variations in an output of the wavelength-converted wave are extremely large when the wavelength of the fundamental wave varies.

SUMMARY OF THE INVENTION

In view of the foregoing observation, the primary object of the present invention is to provide an optical wavelength converter that prevents output variations in a wavelength-converted wave even when the wavelength of the fundamental wave varies.

To this end, according to one aspect of the present invention, there is provided an optical wavelength converter in which the fundamental wave emitted from a fundamental wave light source is introduced into a non-linear optical material, so that the wavelength of the fundamental wave is converted, the converter comprising:

a filter that absorbs only one of two wavelength-converted waves which are emitted from the non-linear optical material in directions opposite to each other.

In a preferred mode, light transmission end faces of an element interposed between the filter and the non-linear optical material are covered with an antireflection coating.

According to another aspect of the present invention, there is provided an optical wavelength converter in which the fundamental wave emitted from a fundamental wave light source is introduced into a non-linear optical material, so that the wavelength of the fundamental wave is converted, the converter comprising:

a reflecting optical element which reflects only one of two wavelength-converted waves which are emitted from the non-linear optical material in directions opposite to each other, and which causes the reflected wavelength-converted wave to travel along an optical path which does not return to the non-linear optical material.

In a preferred mode, light transmission end faces of an element interposed between the filter and the non-linear are covered with an antireflection coating with respect to the wavelength-converted waves.

In the first optical wavelength converter element having the foregoing construction, one of the two wavelength-converted waves that are emitted from the non-linear optical material in directions opposite to each other is absorbed by the filter, and hence it will not turn back along the optical path. Therefore, this wavelength-converted wave and the other wavelength-converted wave that is emitted to the opposite direction will not be combined together. Even when the wavelength of the fundamental wave varies, an output of the wavelength-converted wave will not be significantly changed by the preveiously mentioned interference.

Even when a filter that acts in the manner mentioned above is provided, if an element such as a solid-state crystal is interposed between the filter and the non-linear optical material, the wavelength-converted wave might be reflected from the light transmission end faces of the element, and they might turn back along the optical path. For this reason, as mentioned in the preferred mode, the light transmission end faces of the element, such as a solid-state laser or the like, are covered with an antireflection coating with respect to the wavelength-converted wave, whereby the wavelength-converted wave will never be reflected from the end faces of the element and will never return along the optical path. In this case, it also becomes possible to ensure the prevention of output variations in the wavelength-converted wave.

On the other hand, in the optical wavelength converter of the second preferred mode of this invention, one of the two wavelength-converted waves that are emitted from the non-linear optical material in directions opposite to each other is reflected from the reflecting optical element, and this reflected wave will not return to the non-linear optical material along the optical path. Hence, in this converter, the wavelength-converted wave thus reflected and the other wavelength-converted wave, which is emitted from the non-linear optical material in the direction opposite to the reflected wave, will not be combined together. Accordingly, when the wavelength of the fundamental wave varies, an output of the wavelength-converted wave will not significantly change as a result of the foregoing interference.

Moreover, even when the reflecting optical element that acts in the manner as mentioned above is provided, if the element such as a solid-state laser crystal is interposed between the reflecting optical element and the non-linear optical material, the wavelength-converted wave might be reflected from light transmission end faces of the element, and the reflected wave might turn back'along the optical path. For this reason, as mentioned in the preferred mode, the light transmission end faces of the element such as a solid-state laser crystal are covered with an antireflection coating with respect to the wavelength-converted wave, whereby the wavelength-converted wave will not be reflected from the end faces of the element and will not return along the optical path Hence, in this case, it also becomes possible to ensure the prevention of output variations in the wavelength-converted wave.

DESCRIPTION OF THE EMBODIMENTS

With reference to the accompanying drawings, preferred embodiments of the present invention will be described in detail hereinbelow.

First Embodiment

Figure 1:
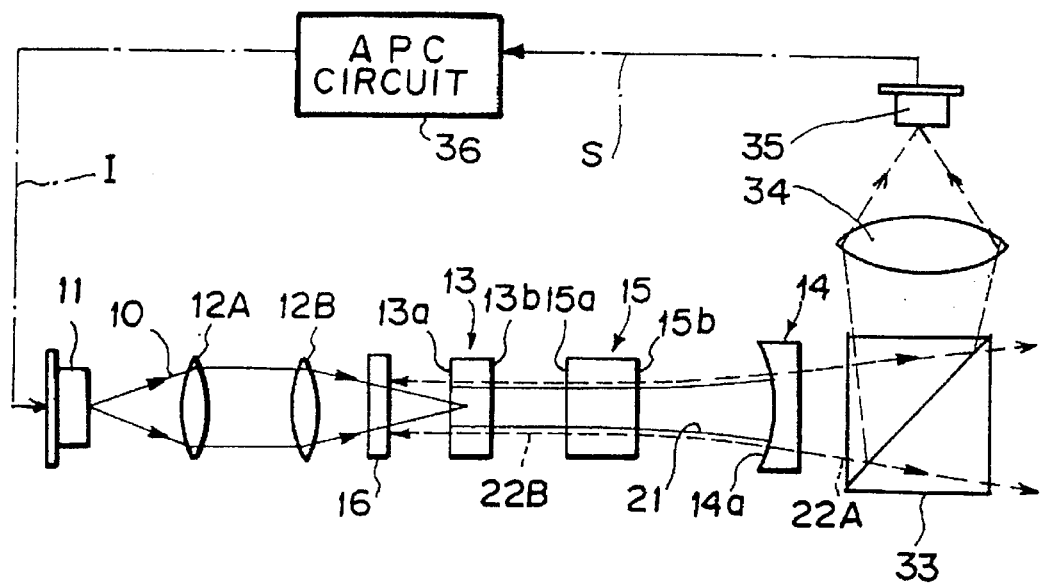
FIG. 1 is a schematic side elevation showing a laser-diode diode-pumped solid-state laser which accommodates an optical wavelength converter according to a first embodiment of the present invention.

FIG. 1 shows an optical wavelength converter according to a first embodiment of the present invention. As one example, this optical wavelength converter is incorporated into a laser-diode-pumped solid-state laser. This laser-diode-pumped solid-state laser is composed of: a semiconductor laser (phased-array laser) 11 which emanates a laser beam 10 as a pump beam; a collimator lens 12A that converts a diverging beam of the laser beam 10 into a collimated beam; a condenser lens 12B that converges the collimated laser beam 10; a YVO$_4$ crystal 13 (hereinafter referred to as Nd:YVO$_4$ crystal) which is a solid-state laser medium doped with neodymium (Nd); and a resonator mirror 14 disposed (at the right side in the drawing) in front of the Nd:YVO$_4$ crystal 13.

A KTP crystal 15 which is a non-linear optical material is interposed between the Nd:YVO$_4$ crystal 13 and the resonator mirror 14. A filter 16, which will be described laser, is interposed between the condenser lens 1 2B and the Nd:YVO$_4$ crystal 13.

The above-mentioned elements are mounted in a common housing (not shown) as one body. The temperatures of the phased-array laser 11 and the KTP crystal 15 are adjusted to a predetermined temperature by means of a non-illustrated Peltier element and a non-illustrated temperature controlling element.

A phased array laser that emanates the laser beam 10 having a wavelength of $\lambda_1$=808 nm is used as the phased array laser 11. The Nd: YVO$_3$ crystal is pumped by the laser beam 10, and neodymium atoms are excited, whereby a laser beam 21 having a wavelength of $\lambda_2$=1064 nm is emanated. This laser beam 21 enters the KTP crystal 15, and it is then converted into a second harmonic wave having a wavelength of $\lambda_3$=$\lambda_2$/2=532 nm. At this time, a second harmonic wave 22A is emitted from the KTP crystal 15 to the front side thereof, that is, toward the resonator mirror 14, whilst a second harmonic wave 22B is emitted from the rear side, that is, toward the semiconductor laser 11.

Here, a rear end face 13a and a front end face 13b of the Nd:YVO$_4$ crystal, a rear end face 15a and a front end face 15b of the KTP crystal 15, and a concave mirror surface 14a of the resonator mirror 14 are respectively provided with coatings that have the following characteristics with respect to a wavelength of $\lambda_1$–808 nm, a wavelength of $\lambda_2$=1064 nm, and a wavelength of $\lambda_3$=532 nm. In the following table, AR designates no reflection (a transmissivity of more than 90%), and HR designates high reflection (a reflectivity of more than 99%).

|         | End Face 13a | End Face 13b | End Face 15a | End Face 15b | Mirror Surface 14a |
|---------|--------------|--------------|--------------|--------------|--------------------|
| 808 nm  | AR           | —            | —            | —            | —                  |
| 1064 nm | HR           | AR           | AR           | AR           | HR                 |
| 532 nm  | AR           | AR           | AR           | AR           | AR                 |

The end faces and mirror surface are provided with these coatings, and hence the laser beam 21 oscillates between the end face 13a of the Nd:YVO$_4$ crystal 13 and the mirror surface 14a. Thus, the laser beam 21 enters the KTP crystal 15 while having a high intensity, and second harmonic waves 22A and 22B are efficiently produced. The second harmonic wave 22A that is emitted in the forward direction passes through the mirror surface 14a of the resonator mirror 14, and it then leaves to the outside from this resonator mirror 14.

The filter 16 has characteristics that permit the laser beam 10 having a wavelength of 808 nm, acting as a pump beam, to pass through in a superior manner, but that absorb the second harmonic wave 22B having a wavelength of 532 nm in a superior manner. The rear end face 13a and the front end face 13b of the Nd:YVO$_4$ crystal 13 are provided with the above-mentioned coatings, and hence the second harmonic wave 22B that is emitted from the rear side of the KTP crystal 15 passes through these end faces 13a and 13b in a superior manner, and is then absorbed by the filter 16. This second harmonic wave 22B will not return to the front side of the KTP crystal 15 upon reflection. Therefore, this second harmonic wave 22B will not be combined with the second harmonic wave 22A that is emitted from the KTP crystal 15 in the forward direction. Thus, even when the wavelength of the laser beam 21 that acts as the fundamental wave varies, an output of the second harmonic wave 22A will not be significantly changed by interference between the second harmonic wave 22A and the second harmonic wave 22B.

In this optical wavelength converter, a part of the second harmonic wave 22A that is emitted from the resonator mirror 14 is bifurcated by a beam splitter 33, and is then converged by a condenser lens 34. Thereafter, this converged wave is detected by a photodetector 35. A light quantity detection signal S outputted from the photodetector 35 is inputted to an APC (automatic power control) circuit 36. Thereby, a drive current I of the semiconductor laser 11 is controlled on the basis of this light quantity detection signal S, and an output of the second harmonic wave 22A is made constant.

In such a construction, if the output of the second harmonic wave 22A significantly varies, because of the above-mentioned interference, to the extent to which the output drops to nearly zero, it becomes impossible to make the output of the second harmonic wave 22A constant even when the semiconductor laser drive current I is set to its maximum value. However, when variations in the output of the second harmonic wave 22A are prevented in the manner as mentioned above, the control range of the semiconductor laser drive current I is also reduced, and hence the second harmonic wave 22A having a stable output will be obtained.

Figure 2:
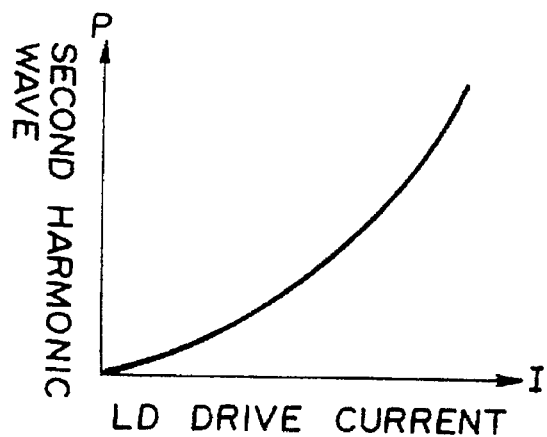
FIG. 2 is a graph showing the relationship between a semiconductor laser drive current and a second harmonic wave output in the laser-diode-pumped solid-state laser.

FIG. 2 shows variations in the output of the second harmonic wave 22A when the drive current I of the semiconductor laser 11 is changed in the laser-diode-pumped solid-state laser. The wavelength of the laser beam 21 that acts as the fundamental wave varies as the drive current I changes. Even in such a case, as shown in the drawing, an output P of the second harmonic wave 22A shows no significant variation.

Figure 9:
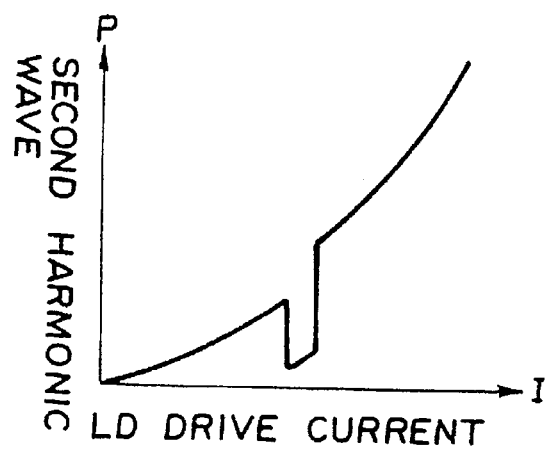
FIG. 9 is a graph showing the relationship between a semiconductor laser drive current and a second harmonic wave output in the laser-diode-pumped solid-state laser which accommodates a conventional optical wavelength converter.

Contrary to this, in a conventional construction, the filter 16 is removed from the construction shown in FIG. 1, and the end face 13b of the Nd:YVO$_4$ crystal 13 is provided with the coating which has the HR characteristic with respect to the second harmonic wave having the wavelength of $\lambda_3$=532 nm. Moreover, this conventional construction is arranged in such a way that the second harmonic wave 22B turns back in the forward direction. A similar experiment was conducted using this conventional construction, and a result of this experiment is shown in FIG. 9. As shown in the drawing, when the drive current I of the semiconductor laser 11 varies, the output P of the second harmonic wave 22A might significantly change. This is attributable to interference between the second harmonic wave 22B, which turned back, and the second harmonic wave 22A.

In the resonator of the laser, Brewster plates, for changing an oscillation mode of the laser to a single longitudinal mode, etalons, and $\lambda/4$ plates, for realizing a twist mode, may be provided in an appropriate manner. The optical wavelength converter of the present invention yields effects similar to those mentioned above. This will also be true of the other embodiments which will be described later.

Second Embodiment

Figure 3:
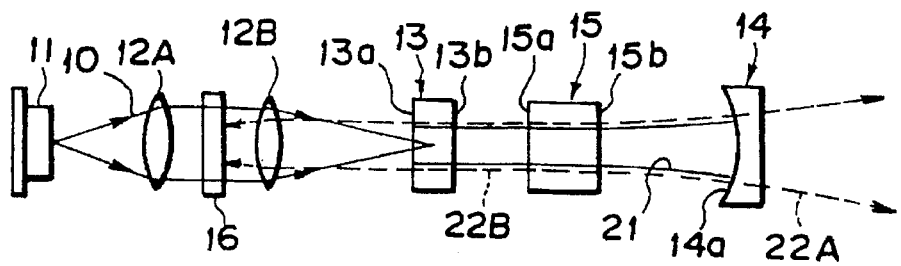
FIG. 3 is a schematic side elevation showing a laser-diode-pumped solid-state laser which accommodates an optical wavelength converter according to a second embodiment of the present invention.

With reference to FIG. 3, a laser-diode-pumped solid-state laser according to a second embodiment of the present invention will now be described. In this drawing, the same reference numerals are provided to designate corresponding features shown in FIG. 1, and hence the explanation thereof will be omitted here for brevity. (The same applies to the other embodiments.)

The laser-diode-pumped solid-state laser of this embodiment is different from that of the first embodiment in the position of the filter 16. In this embodiment, the filter 16 is positioned between the collimator lens 12A and the condenser lens 12B, within the entrance optical system. Even in this construction, the second harmonic wave 22B which is emitted from the KTP crystal 15 in the backward direction thereof is absorbed by the filter 16, and hence effects similar to those obtained in the first embodiment will be obtained.

Third Embodiment

Figure 4:
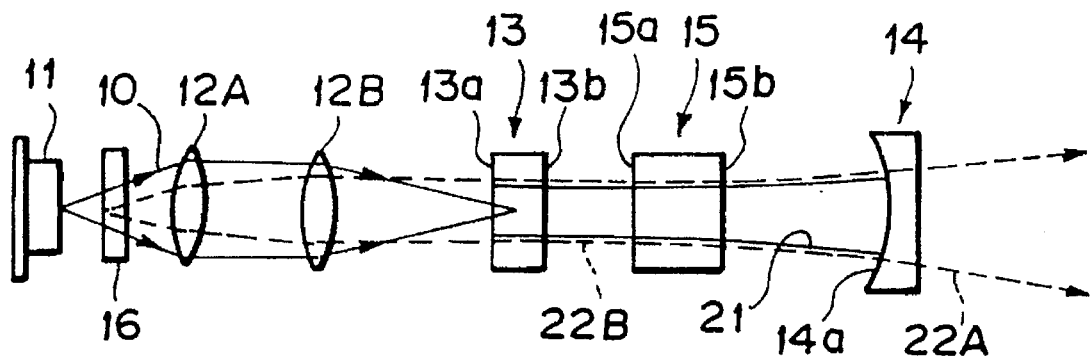
FIG. 4 is a schematic side elevation showing a laser-diode-pumped solid-state laser which accommodates an optical wavelength converter according to a third embodiment of the present invention.

With reference to FIG. 4, a laser-diode-pumped solid-state laser according to a third embodiment of the present invention will now be described. The solid-state laser of this embodiment is also different from that of the first embodiment in the position of the filter 16. In this embodiment, the filter 16 is positioned between the semiconductor laser 11 and the collimator lens 12A. Even in this construction, the second harmonic wave 22B that is emitted from the KTP crystal 15 in the backward direction thereof is absorbed by the filter 16, and effects similar to those obtained in the first and second embodiments will be obtained.

Fourth Embodiment

Figure 5:
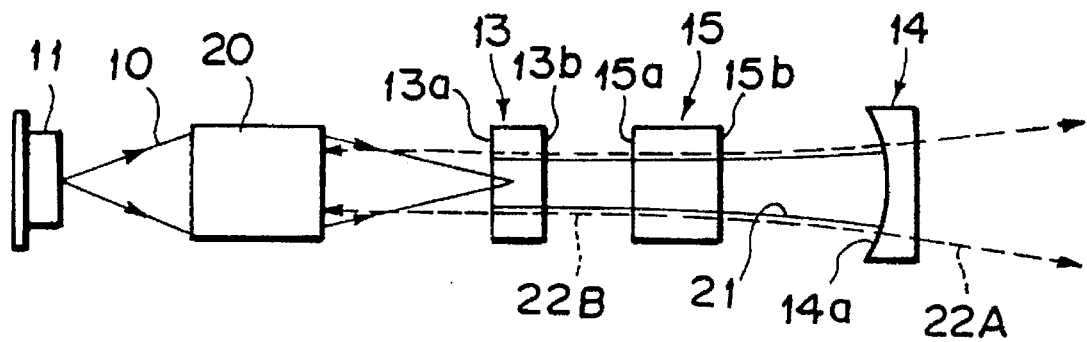
FIG. 5 is a schematic side elevation showing a laser-diode-pumped solid-state laser which accommodates an optical wavelength converter according to a fourth embodiment of the present invention.

With reference to FIG. 5, a laser-diode-pumped solid-state laser according to a fourth embodiment of the present invention will now be described. In the solid-state laser of this embodiment, an entrance optical system 20 having a filtering function is used instead of the collimator lens 12A and the condenser lens 12B used in the first–third embodiments. This entrance optical system 20 with a filtering function consists of, for example, a distributed index lens. The optical system performs the light collecting action which is basically the same as that performed by the collimator lens 12A and the condenser lens 12B. In addition to this, this optical system is provided with a filtering function which is the same as that of the filter 16 used in the first to third embodiments.

Even in this construction, the second harmonic wave 22B that is emitted from the KTP crystal 15 in the backward direction thereof is absorbed by the entrance optical system 20 with a filtering function, and hence effects similar to those obtained in the first–third embodiments will be obtained.

Fifth Embodiment

Figure 6:
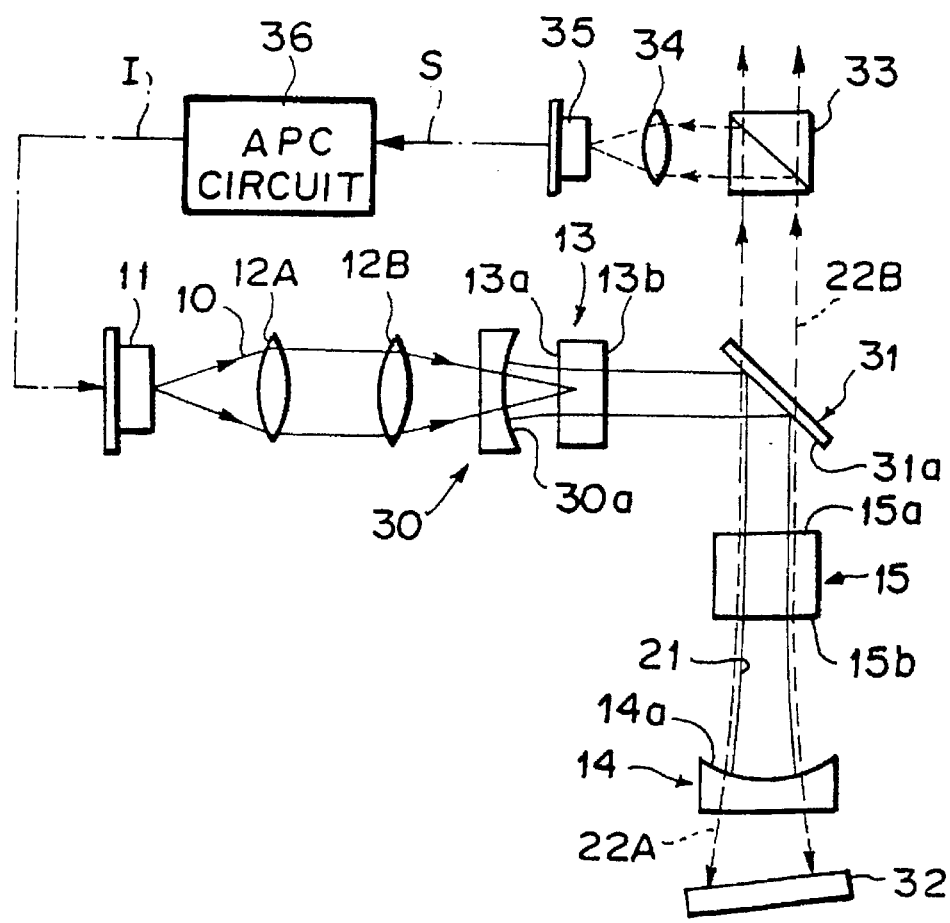
FIG. 6 is a schematic side elevation showing a laser-diode-pumped solid-state laser which accommodates an optical wavelength converter according to a fifth embodiment of the present invention.

With reference to FIG. 6, a laser-diode-pumped solid-state laser according to a fifth embodiment of the present invention will now be described. In the solid-state laser of this embodiment, contrary to the first-fourth embodiments, the second harmonic wave 22B that is emitted from the KTP crystal 15 in the backward direction thereof is extracted from the resonator.

A resonator mirror 30 which constitutes a solid-state laser resonator together with the resonator mirror 14 is interposed between the Nd:YVO$_4$ crystal 13 and the condenser lens 12B, and a dichroic mirror 31 is disposed within the solid-state laser resonator. A concave mirror surface 30a of the resonator mirror 30, the rear end face 13a and the front end face 13b of the Nd:YVO$_4$, and the mirror surface 31a of the dichroic mirror 31 are respectively provided with coatings that have the following characteristics with respect to a wavelength of $\lambda_1$=808 nm, a wavelength of $\lambda_2$=1064 nm, and a wavelength of $\lambda_3$=532 nm. In the following table, AR designates no reflection (a transmissivity of more than 90%), and HR designates high reflection (a reflectivity of more than 99%). In addition, the rear end face 15a and the front end face 15b of the KTP crystal 15, and the concave mirror surface 14a of the resonator mirror 14 are provided with the same coatings as provided in the first embodiment.

| | Mirror Surface 30a | End Face 13a | End Face 13b | Mirror Surface 31a |
|---|---|---|---|---|
| 808 nm | AR | AR | — | — |
| 1064 nm | HR | AR | AR | HR |
| 532 nm | — | — | — | AR |

The laser beam 21 is reflected from the mirror surface 31a of the dichroic mirror 31, and it then changes its optical path. The laser beam 21 oscillates between the mirror surface 30a of the resonator mirror 30 and the mirror surface 14a of the resonator mirror 14. In this manner, the laser beam 21 enters the KTP crystal 15 while oscillating and having a high intensity, and hence the second harmonic waves 22A and 22B are efficiently produced. The second harmonic wave 22B that is emitted from the KTP crystal 15 in the backward direction thereof passes through the mirror surface 31a of the dichroic mirror 31. This wave is then emitted upward from the dichroic mirror 31.

On the other hand, the other second harmonic wave 22A that is emitted from the KTP crystal 15 in the forward direction thereof passes through the mirror surface 14a of the resonator mirror 14, and is emitted to the outside from the resonator mirror 14. A filter 32 is provided outside this resonator mirror 14, and the second harmonic wave 22A that is emitted from the resonator mirror 14 is absorbed by this filter 32. Thus, the second harmonic wave 22A will not turn back in the backward direction of the KTP crystal, and hence the second harmonic wave 22A will not be combined with the second harmonic wave 22B that is emitted from the KTP crystal 15 in the backward direction thereof. Therefore, when the wavelength of the laser beam 21 that acts as the fundamental wave varies, the output of the second harmonic wave 22B will not be significantly changed by interference between the second harmonic wave 22A and the second harmonic wave 22B.

In this laser-diode-pumped solid-state laser, a part of the second harmonic wave 22B that is emitted from the dichroic mirror 31 is bifurcated by the beam splitter 33, and is then converged by the condenser lens 34. Thereafter, this converged wave is detected by the photodetector 35. The light quantity detection signal S outputted from the photodetector 35 is inputted to the APC (automatic power control) circuit 36. Thereby, the drive current I of the semiconductor laser 11 is controlled on the basis of this light quantity detection signal S, and the output of the second harmonic wave 22B is made constant.

In such a construction, as with the first embodiment, if the output of the second harmonic wave 22B significantly varies, because of the above-mentioned interference, to the extent to which the output drops to nearly zero, it becomes impossible to make the output of the second harmonic wave 22B constant even when the semiconductor laser drive current I is set to its maximum value. However, when variations in the output of the second harmonic wave 22B are prevented in the manner as mentioned above, the control range of the semiconductor laser drive current I is also reduced, and hence the second harmonic wave 22B having a stable output will be obtained.

Sixth Embodiment

Figure 7:
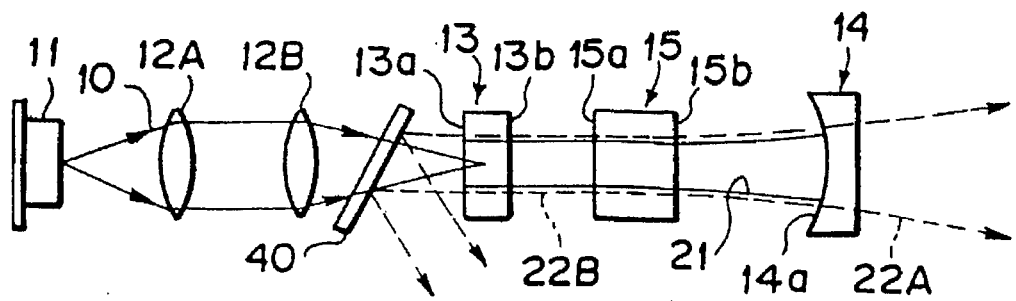
FIG. 7 is a schematic side elevation showing a laser-diode-pumped solid-state laser which accommodates an optical wavelength converter according to a sixth embodiment of the present invention.

With reference to FIG. 7, a laser-diode-pumped solid-state laser according to this embodiment will now be described. The laser of this embodiment is different from that of the first embodiment merely in that a dichroic mirror 40 is provided instead of the filter 16. This dichroic mirror 40 has characteristics that permit the laser beam 10, which acts as a pump beam and has a wavelength of 808 nm, to pass through in a superior manner but reflects the second harmonic wave 22B having a wavelength of 532 nm. This dichroic mirror 40 is positioned at a predetermined inclined angle with respect to the axis of the resonator.

The second harmonic wave 22B that is emitted from the KTP crystal 15 in the backward direction thereof passes through the end faces 13a and 13b of the Nd:YVO$_4$ crystal 13, and this wave is then reflected from the dichroic mirror 40 to the outside, off the axis of the resonator. Therefore, even in this case, the second harmonic wave 22B will not turn back in such a way that it reenters the KTP crystal 15. Moreover, the second harmonic wave 22B will not be combined with the second harmonic wave 22A that is emitted from the KTP crystal 15 in the forward direction thereof. Hence, when the laser beam 21 that acts as the fundamental wave varies, the output of the second harmonic wave 22A will not be significantly changed by interference between the second harmonic wave 22A and the second harmonic wave 22B.

Seventh Embodiment

Figure 8:
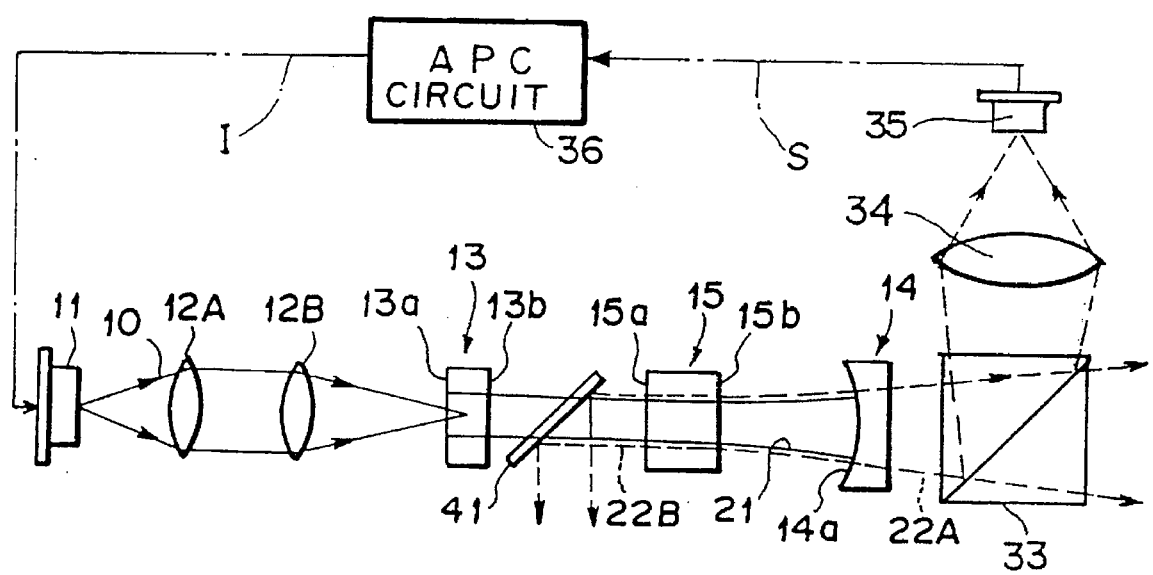
FIG. 8 is a schematic side elevation showing a laser-diode-pumped solid-state laser which accommodates an optical wavelength converter according to a seventh embodiment of the present invention.

With reference to FIG. 8, a laser-diode-pumped solid-state laser of this embodiment will now be described. The laser of this embodiment is different from that of the sixth embodiment in the location and characteristics of the dichroic mirror that reflects the second harmonic wave 22B. Namely, in this embodiment, a dichroic mirror 41 is interposed between the Nd:YVO$_4$ crystal 13 and the KTP crystal 15. This dichroic mirror 41 has the characteristics that permit the laser beam 21 having a wavelength of 1064 nm to pass through in a superior manner, and the mirror is positioned at a predetermined inclined angle with respect to the axis of the resonator.

Even in this case, the second harmonic wave 22B that is emitted from the KTP crystal 15 in the backward direction thereof is reflected from the dichroic mirror 41 in the direction outside and off the axis of the resonator, and effects similar to the those obtained in the sixth embodiment will be obtained. The dichroic mirror 41 may be replaced with a Brewster plate covered with a coating that reflects light at a wavelength of 532 nm.

In the laser-diode-pumped solid-state laser of this embodiment, control similar to that carried out in the first embodiment is also effected by the APC circuit 36, whereby the output of the second harmonic wave 22A is made constant. Even in this construction, if variations in output of the second harmonic wave 22A are prevented in the manner as mentioned in the above, the control range of the semiconductor laser drive current I will be also reduced, and hence the second harmonic wave 22A having a stable output will be obtained.

Explanations have been provided to the embodiments in which a second harmonic wave is produced by the use of a KTP crystal as a non-linear optical material. However, as a matter of course, it is to be noted that the present invention is applicable to an optical wavelength converter which uses non-linear optical materials other than the KTP crystal and to optical wavelength converters which produce a third harmonic wave, a sum frequency, a difference frequency, or the like, other than the second harmonic wave.

Moreover, the present invention is applicable to a laser which uses a laser medium other than the Nd:YVO$_4$ crystal, and to a laser other than a laser-diode-pumped solid-state laser.

In the case where a crystal having a birefringence is used as a solid-state laser crystal, if the end faces of the crystal are covered with a high reflection coating with respect to a wavelength-converted wave, variations in the output of the wavelength-converted wave will be extremely large when the wavelength of the fundamental wave varies as previously mentioned. Hence, the present patent is particularly effective when applied to a solid-state laser which uses such a solid-state laser crystal.

Several embodiments of the invention have now been described in detail. It is to be noted, however, that these descriptions of specific embodiments are merely illustrative of the principles underlying the inventive concept. It is contemplated that various modifications of the disclosed embodiments, as well as other embodiments of the invention will, without departing from the spirit and scope of the invention, be apparent to those who are versed in the art.

What is claimed is:

1. An optical wavelength converter comprising:
   a light source which emits a fundamental wave,
   a resonator having two surfaces which reflect the fundamental wave, thereby resonating the fundamental wave,
   a non-linear optical material, disposed in the resonator, which converts the wavelength of the fundamental wave, which is resonating within the resonator, into a first wavelength-converted wave which advances in a first direction and exits said resonator, and said non-linear optical material further converts said wavelength of the fundamental wave which re-enters said non-linear optical material after reflecting from one of said two surfaces into a second wavelength-converted wave having the same wavelength as said first wavelength-converted wave and advancing in a direction opposite to said first direction,
   a filter, located in the propagation path of said second wavelength-converted wave, which absorbs said second wavelength converted wave, thereby reducing the chance that said second wavelength converted wave returns toward the non-linear optical material and interferes with said first wavelength converted wave, and
   an entrance optical system which introduces the fundamental wave into the resonator.

2. An optical wavelength converter as defined in claim 1, wherein said filter is positioned between said light source and said resonator.

3. An optical wavelength converter as defined in claim 1, wherein said filter is positioned in the resonator.

4. An optical wavelength converter as defined in claim 1, wherein said filter is disposed within said entrance optical system.

5. An optical wavelength converter as defined in any one of claims 1–4, wherein light transmission end faces of an element interposed between said filter and said non-linear optical material are covered with an antireflection coating.

6. An optical wavelength converter comprising:
   a light source which emits a fundamental wave,
   a resonator having two surfaces, said resonator receiving the fundamental wave so that the fundamental wave is reflected between the two surfaces, thereby resonating the fundamental wave,
   a non-linear optical material, disposed in the resonator, which converts the wavelength of the fundamental wave, which is resonating within the resonator, into a first wavelength-converted wave which advances in a first direction and exits said resonator, and said non-linear optical material further converts said wavelength of the fundamental wave which re-enters said non-linear optical material after reflecting from one of said two surfaces into a second wavelength-converted wave having the same wavelength as said first wavelength-converted wave and advancing in a direction opposite to said first direction,
   an entrance optical system which introduces the fundamental wave into the resonator, and
   a reflecting optical element, located in the propagation path of the second wavelength-converted wave for reflecting the second wavelength-converted wave and causing the second wavelength-converted wave to travel along an optical path which does not return toward said non-linear optical material, thereby reducing the chance that said second wavelength converted wave interferes with said first wavelength converted wave.

7. An optical wavelength converter as defined in claim 6, wherein said reflecting optical element is positioned between said light source and said resonator.

8. An optical wavelength converter as defined in claim 6, wherein said reflecting optical element is positioned in the resonator.

9. An optical wavelength converter as defined in any one of claims 6–8, wherein light transmission end faces of an element interposed between said reflecting optical element and said non-linear optical material are covered with an antireflection coating.

10. An optical wavelength converter comprising:
    a light source which emits a light beam,
    a laser crystal which receives the light beam and emits a fundamental wave,
    a resonator having two surfaces which reflect the fundamental wave and which are disposed on opposite sides of the laser crystal, thereby resonating the fundamental wave,
    an entrance optical system for introducing said light beam emitted by said light source into said laser crystal,
    a non-linear optical material, disposed in the resonator, which converts the wavelength of the fundamental wave, which is resonating within the resonator, into a first wavelength-converted wave which advances in a first direction and exits said resonator, and said non-linear optical material further converts said wavelength of the fundamental wave which re-enters said non-linear optical material after reflecting from one of said two surfaces into a second wavelength-converted wave having the same wavelength as said first wavelength-converted wave and advancing in a direction opposite to said first direction, and a filter disposed in the propagation path of said first portion of the wavelength-converted wave, which absorbs said second wavelength-converted wave, thereby reducing the chance that said first portion of the wavelength-converted wave returns toward the non-linear optical material and interferes with said first wavelength-converted wave.

11. An optical wavelength converter as defined in claim 10, wherein said filter is positioned between said light source and said resonator.

12. An optical wavelength converter as defined in claim 10, wherein said filter is positioned in the resonator.

13. An optical wavelength converter as defined in claim 10, wherein said filter is disposed within said entrance optical system.

14. An optical wavelength converter as defined in any one of claims 10–13, wherein light transmission end faces of an element interposed between said filter and said non-linear optical material are covered with an antireflection coating.

15. An optical wavelength converter comprising:

a light source which emits a light beam, a laser crystal which receives the light beam and emits a fundamental wave, a resonator having two surfaces which reflect the fundamental wave and which are disposed on opposite sides of the laser crystal, thereby resonating the fundamental wave, an entrance optical system for introducing said light beam emitted by said light source into said laser crystal, a non-linear optical material, disposed in the resonator, which converts the wavelength of the fundamental wave, which is resonating within the resonator, into a first wavelength-converted wave which advances in a first direction and exits said resonator, and said non-linear optical material further converts said wavelength of the fundamental wave which re-enters said non-linear optical material after reflecting from one of said two surfaces into a second wavelength-converted wave having the same wavelength as said first wavelength-converted wave and advancing in a direction opposite to said first direction, and a reflecting optical element disposed in the propagation path of said second wavelength-converted wave, for reflecting said second wavelength-converted wave and causing the reflected second wavelength-converted wave to travel along an optical path which does not return toward said non-linear optical material, thereby reducing the chance that said second wavelength-converted wave interferes with said first wavelength-converted wave.

16. An optical wavelength converter as defined in claim 15, wherein said reflecting optical element is positioned between said light source and said resonator.

17. An optical wavelength converter as defined in claim 15 wherein said reflecting optical element is positioned in the resonator.

18. An optical wavelength converter as defined in any one of claims 15–17, wherein light transmission end faces of an element interposed between said reflecting optical element and said non-linear optical material are covered with an antireflection coating.

19. An optical wavelength converter comprising:

a light source which emits a light beam, a laser crystal which receives the light beam and emits a fundamental wave, a resonator having two surfaces which reflect the fundamental wave and which are disposed on opposite sides of the laser crystal, thereby resonating the fundamental wave, and having an optical element which changes the direction in which said resonating fundamental wave advances, a non-linear optical material, disposed between said optical element and one of said two surfaces which is positioned away from said light source, which convert the wavelength of the fundamental wave, which is resonating within the resonator, into a first wavelength-converted wave which advances in a first direction and exits said resonator through said optical element, and said non-linear optical material further converts said wavelength of the fundamental wave which re-enters said non-linear optical material after reflecting from one of said two surfaces into a second wavelength-converted wave having the same wavelength as said first wavelength-converted wave and advancing in a direction opposite to said first direction, an entrance optical system for introducing said light beam emitted by said light source into said laser crystal, and a filter for absorbing said second wavelength-converted wave, said second wavelength-converted wave advancing from said non-linear optical material in a direction away from said optical element, thereby reducing the chance that said second wavelength converted wave returns toward the non-linear optical material and interferes with said first wavelength converted wave.

20. An optical wavelength converter as defined in claim 19, wherein said filter is positioned outside said resonator.

21. An optical wavelength converter as defined in claim 19, wherein said filter is positioned in the resonator.

22. An optical wavelength converter as defined in any one of claims 19–21, wherein light transmission end faces of an element interposed between said filter and said non-linear optical material are covered with an antireflection coating.

23. An optical wavelength converter comprising:

a light source which emits a light beam, a laser crystal which receives the light beam and emits a fundamental wave, a resonator having two surfaces which reflect the fundamental wave and which are disposed on opposite sides of the laser crystal, thereby resonating the fundamental wave, and having an optical element which changes the direction in which said resonating fundamental wave advances, an entrance optical system for introducing said light beam emitted by said light source into said laser crystal, a non-linear optical material, disposed between said optical element and one of said two surfaces which is positioned away from said light source, which converts the wavelength of the fundamental wave, which is resonating within the resonator, into a first wavelength-converted wave which advances in a first direction and exits said resonator through said optical element, and said non-linear optical material further converts said wavelength of the fundamental wave which re-enters said non-linear optical material after reflecting from one of said two surfaces into a second wavelength-converted wave having the same wavelength as said first wavelength-converted wave and advancing in a direction opposite to said first direction, and a reflecting optical element for reflecting said second wavelength-converted wave, said second wavelength converted wave advancing in a direction away from said optical element, said reflecting optical element causing said second wavelength-converted wave to travel along an optical path which does not return toward said non-linear optical material, thereby reducing the chance that said second wavelength-converted wave returns toward the non-linear optical material and interferes with said first wavelength converted wave.

24. An optical wavelength converter as defined in claim 23, wherein said reflecting optical element is positioned outside the resonator.

25. An optical wavelength converter as defined in claim 23, wherein said reflecting optical element is positioned in the resonator.

26. An optical wavelength converter as defined in any one of claims 23–25, wherein light transmission end faces of an element interposed between said reflecting optical element and said non-linear optical material are covered with an anti-reflection coating.

* * * * *